US011215141B2

(12) United States Patent
Gardes et al.

(10) Patent No.: US 11,215,141 B2
(45) Date of Patent: Jan. 4, 2022

(54) JET ENGINE COMPRISING A NACELLE EQUIPPED WITH REVERSER FLAPS PROVIDED WITH VORTEX-GENERATING MEANS

(71) Applicant: Airbus Operations SAS, Toulouse (FR)

(72) Inventors: Pascal Gardes, Levignac (FR);
Frédéric Ridray, L'isle Jourdain (FR);
Lionel Czapla, Cornebarrieu (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 308 days.

(21) Appl. No.: 16/431,173

(22) Filed: Jun. 4, 2019

(65) Prior Publication Data
US 2020/0025141 A1 Jan. 23, 2020

(30) Foreign Application Priority Data
Jun. 26, 2018 (FR) ...................... 1855688

(51) Int. Cl.
| F02K 1/72 | (2006.01) |
| B64D 29/00 | (2006.01) |
| B64D 33/04 | (2006.01) |
| F02K 1/76 | (2006.01) |

(52) U.S. Cl.
CPC ............. *F02K 1/72* (2013.01); *F02K 1/763* (2013.01); *B64D 29/00* (2013.01); *B64D 33/04* (2013.01); *F05D 2240/14* (2013.01); *F05D 2250/34* (2013.01)

(58) Field of Classification Search
CPC .. F02K 1/70; F02K 1/72; B64D 33/04; B64D 29/00
See application file for complete search history.

(56) References Cited

U.S. PATENT DOCUMENTS

| 3,568,930 | A | * | 3/1971 | Kuchar | F02K 1/62 |
| | | | | | 239/265.19 |
| 5,396,762 | A | * | 3/1995 | Standish | F02K 1/563 |
| | | | | | 239/265.19 |
| 5,937,636 | A | * | 8/1999 | Gonidec | F02K 1/74 |
| | | | | | 60/226.2 |
| 2014/0137541 | A1 | | 5/2014 | Caruel | |
| 2015/0267640 | A1 | * | 9/2015 | Gormley | F02K 1/80 |
| | | | | | 239/265.19 |
| 2016/0160798 | A1 | | 6/2016 | Guerin et al. | |

FOREIGN PATENT DOCUMENTS

FR 3018863 A1 9/2015

OTHER PUBLICATIONS

French Search Report; priority document.

* cited by examiner

*Primary Examiner* — Andrew H Nguyen
(74) *Attorney, Agent, or Firm* — Greer, Burns & Crain, Ltd.

(57) ABSTRACT

A turbofan comprising a motor and a nacelle, surrounding the motor, where a duct for a bypass flow is delimited between the nacelle and the motor and in which a flow of air flows. The nacelle comprises reverser flaps where each one is articulated between a stowed position in which it is not in the bypass duct and a deployed position in which it is across the bypass duct. The turbofan has at least one reverser flap with at least one leakage window configured to allow airflow in the deployed position. The at least one reverser flap has at least one fin extending across the leakage window.

4 Claims, 3 Drawing Sheets

JET ENGINE COMPRISING A NACELLE EQUIPPED WITH REVERSER FLAPS PROVIDED WITH VORTEX-GENERATING MEANS

CROSS-REFERENCES TO RELATED APPLICATIONS

This application claims the benefit of the French patent application No. 1855688 filed on Jun. 26, 2018, the entire disclosures of which are incorporated herein by way of reference.

FIELD OF THE INVENTION

The present invention relates to a turbofan which comprises a nacelle equipped with a plurality of reverser flaps provided with vortex-generating means, and to an aircraft comprising at least one such turbofan.

BACKGROUND OF THE INVENTION

An aircraft includes a fuselage, to each side of which is fixed a wing. Under each wing is suspended at least one turbofan. Each turbofan is fixed under the wing by means of a pylon that is fixed between the structure of the wing and the structure of the turbofan.

The turbofan comprises a motor and a nacelle that is fixed around the motor and a fan that is positioned in front of the motor. The nacelle and the motor bound a bypass duct through which the air flows from forward to rear, passing through the fan to generate the thrust.

The nacelle comprises a plurality of reverser flaps. The reverser flaps are arranged around the bypass duct and each one is able to move in rotation on the structure of the nacelle between a stowed position in which it is not in the bypass duct and a deployed position in which it is positioned across the bypass duct in order to redirect, through windows provided for this purpose, the flow of air from the bypass duct to the outside. Generally, the window houses a cascade which serves to redirect the bypass air flow forwards so as to produce reverse thrust.

Owing to the power of the fan, the air in the bypass duct flows at high speed.

The operational clearances around each reverser flap give rise to passages through which the air can escape, resulting in a rearward flow when the reverser flaps are in the deployed position.

These leaks and the high speed of the air give rise to residual thrust to the rear of the jet engine, which acts counter to the braking effect sought by deploying the reverser flaps, and it is therefore desirable to find a solution by which it is possible to limit the effect of these leaks.

SUMMARY OF THE INVENTION

The present invention has an object of proposing a turbofan comprising a nacelle equipped with a plurality of reverser flaps provided with vortex-generating means.

To that end, the invention proposes a turbofan comprising a motor and a nacelle, surrounding the motor, where a duct for a bypass flow is delimited between the nacelle and the motor and in which a flow of air flows, the nacelle comprising reverser flaps where each one is articulated between a stowed position in which it is not in the bypass duct and a deployed position in which it is across the bypass duct, the turbofan being characterized in that at least one reverser flap has at least one leakage window intended to allow airflow in the deployed position, and in that the at least one reverser flap has at least one fin extending across the leakage window.

A jet engine of this type makes it possible to reduce the effect of the leaks around the reverser flaps by the presence of the fins which transform the flows of air from the leaks into low-energy vortices.

Advantageously, the leakage window comprises the space that extends around the reverser flap.

Advantageously, the leakage window comprises a hole passing through the reverser flap.

Advantageously, the leakage window is in the form of a notch passing through the reverser flap at a downstream edge of the reverser flap.

Advantageously, each fin is in the form of an inclined plane bounded by the perforated faces of the reverser flap.

Advantageously, each fin is in the form of an inclined plane which, on one hand, is bounded by the forward-facing perforated face of the reverser flap and which, on the other hand, extends beyond the rearward-facing perforated face of the reverser flap.

Advantageously, each fin is in the form of a first plane and a second plane continuing from the first plane, the first plane is perpendicular to the plane of the reverser flap and is bounded by the perforated faces of the reverser flap, and the second plane is inclined with respect to the plane of the reverser flap and extends from and beyond the rearward-facing perforated face of the reverser flap.

The invention also proposes an aircraft comprising at least one turbofan in accordance with one of the above variants.

BRIEF DESCRIPTION OF THE DRAWINGS

The features of the invention mentioned above, along with others, will become more clearly apparent on reading the following description of one exemplary embodiment, the description being given with reference to the appended drawings, in which.

DETAILED DESCRIPTION OF THE PREFERRED EMBODIMENTS

Figure 1:
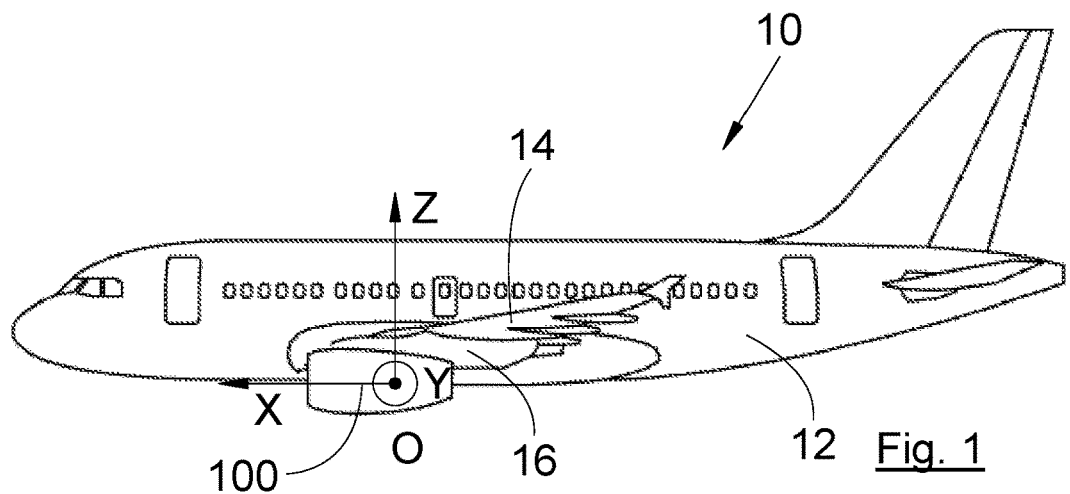
FIG. 1 is a side view of an aircraft comprising a jet engine according to the invention.

FIG. 1 shows an aircraft 10 that comprises a fuselage 12, to each side of which is fixed a wing 14 that bears at least one turbofan 100 according to the invention. The turbofan 100 is fixed under the wing 14 by means of a pylon 16.

Figure 2:
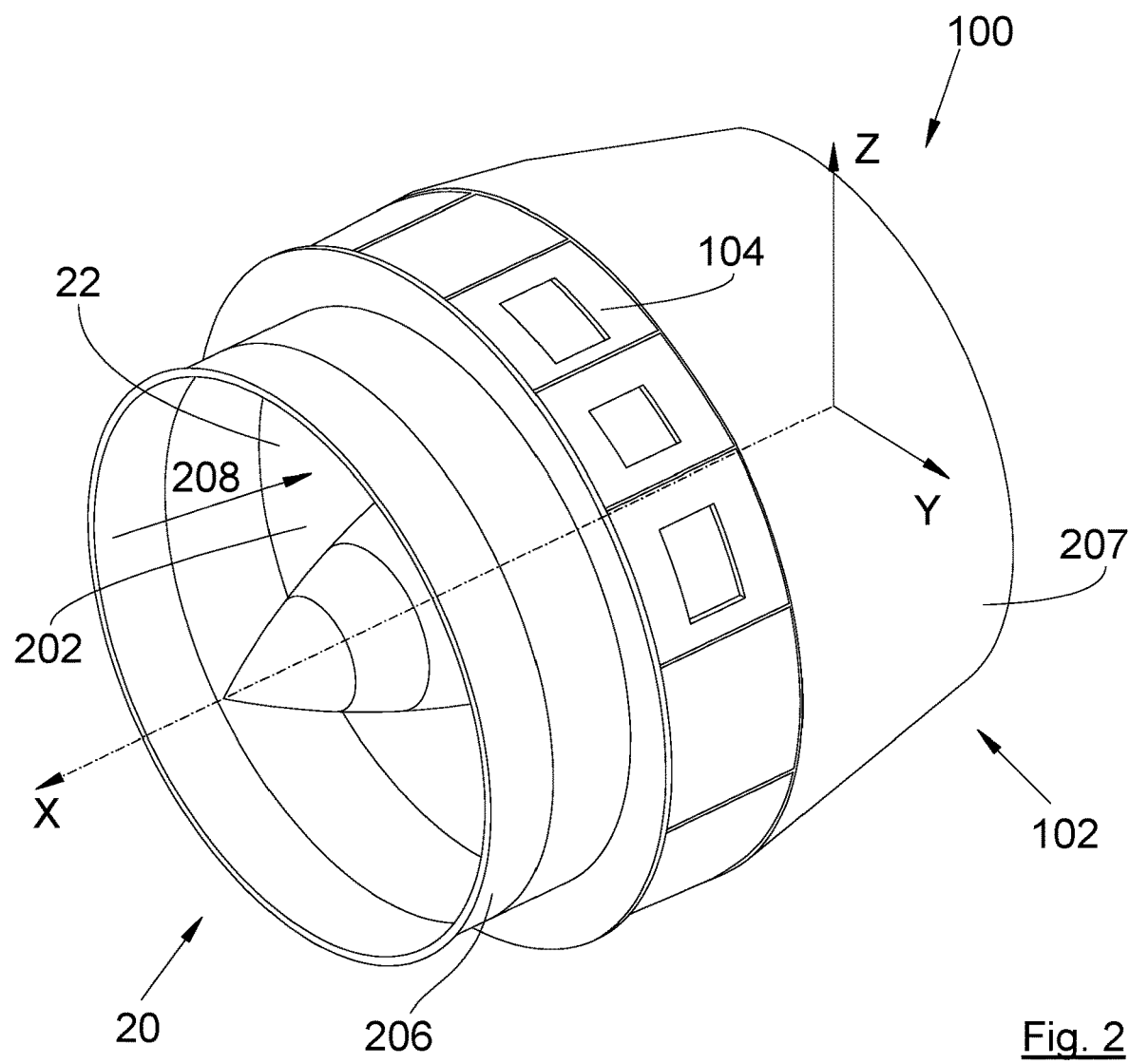
FIG. 2 is a perspective view of the jet engine according to the invention.

FIG. 2 shows the turbofan 100 which has a nacelle 102 and a motor 20 which is housed inside the nacelle 102 and comprises a fan casing 206. In this case, the motor 20 is represented by its front cone and its fan 22 inside the air intake of the nacelle 102.

In the following description, and by convention, X denotes the longitudinal axis of the turbofan 100 that is parallel to the longitudinal or roll axis of the aircraft 10, and oriented positively towards the front of the turbofan 100, Y denotes the transverse axis parallel to the pitch axis of the aircraft which is horizontal when the aircraft is on the ground, and Z denotes the vertical axis parallel to the yaw axis when the aircraft is on the ground, these three directions X, Y and Z being mutually orthogonal and forming an orthonormal frame of reference the origin of which is the center of gravity of the turbofan 100. In the following description, the terms relating to a position refer to the front and the rear of the jet engine 100, which also corresponds to the front and the rear of the aircraft 10.

Figure 3:
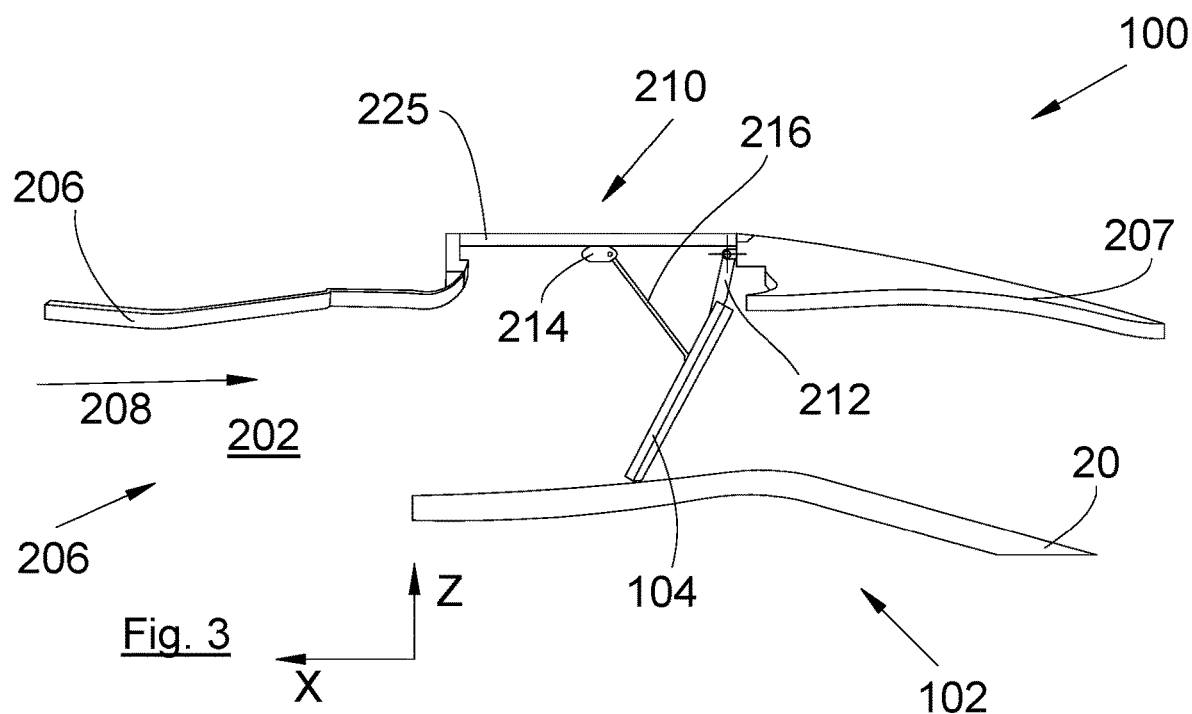
FIG. 3 is a side view in section through the jet engine in the deployed position.

FIG. 3 shows the nacelle 102 in section and in the deployed position of the reverser flaps.

The turbofan 100 has, between the nacelle 102 and the motor 20, a duct 202 in which flows the bypass flow 208 coming from the air intake and through the fan 22, and which therefore flows in a flow direction from forward to rear.

The nacelle 102 has a fixed structure that includes, among other things, the fan casing 206.

The nacelle 102 has a rear cowl 207 forming the walls of the nozzle. The nacelle 102 bears reverser flaps 104 and has an openwork structure forming windows 210 (FIG. 3) around the reverser flaps 104.

The nacelle 102 thus comprises a plurality of reverser flaps 104 distributed over the periphery of and in the interior of the nacelle 102 depending on the angular opening of the window 210 about the longitudinal axis X.

Each reverser flap 104 is mounted in articulated fashion on the structure of the nacelle 102, between a stowed position and a deployed position, and vice versa. Passage from the stowed position to the deployed position is brought about by rotation of the reverser flap 104 towards the interior of the jet engine 100.

In the stowed position, each reverser flap 104 is not in the bypass duct 202, and closes off a region of the window 210. In the deployed position, the reverser flap 104 is positioned across the bypass duct 202 and does not obstruct the window 210, allowing the bypass flow 208 to pass through, and the reverser flap 104 then extends towards the motor 20.

Cascades 225 may be provided across the window 210 in order to orient the forward-redirected flow of air.

Each reverser flap 104 is articulated, by a downstream edge relative to the flow direction, to the structure of the nacelle 102 on hinges 212 while the opposite free edge is positioned in the upstream direction in the stowed position and towards the motor 20 in the deployed position.

Passage from the stowed position to the deployed position and vice versa is effected by any appropriate means known to a person skilled in the art. In the embodiment of the invention presented here, the nacelle 102 comprises, for each reverser flap 104, a carriage 214 mounted so as to be mobile in translation with respect to the structure of the nacelle 102, parallel to the longitudinal axis X, a rod 216 mounted in articulated fashion between the carriage 214 and the reverser flap 104, and an activation system such as a jack, which is provided for the purpose of moving the carriage 214 forward and back so as to make the reverser flap 104 pass from the stowed position to the deployed position and vice versa.

Figure 4:
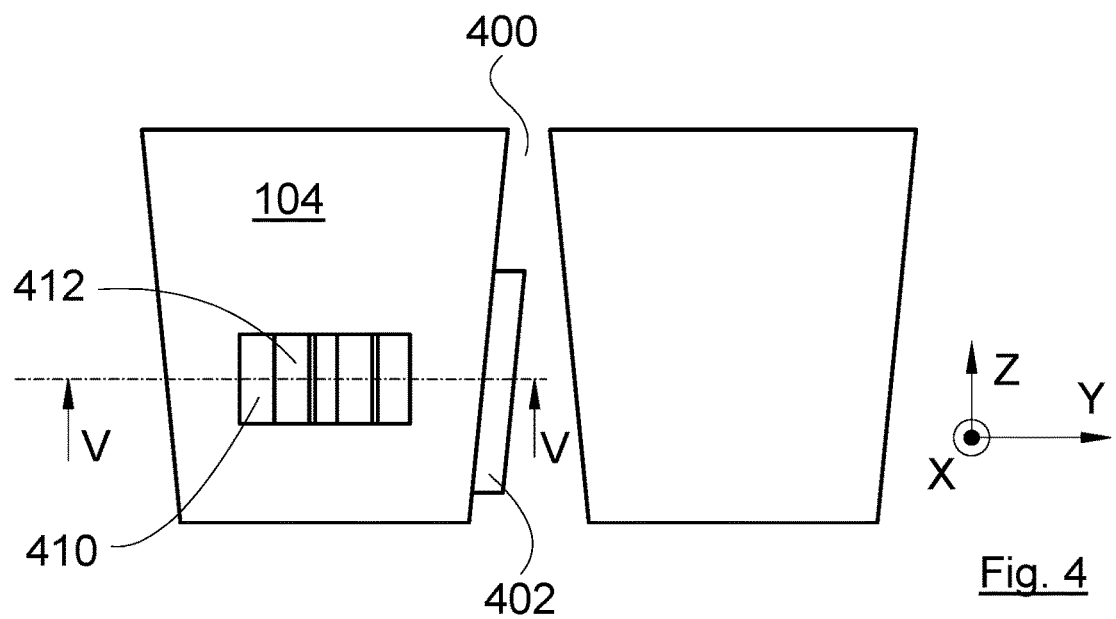
FIG. 4 is a front view in the deployed position of reverser flaps according to a particular embodiment of the invention.

FIG. 4 shows reverser flaps 104 in the deployed position. When two reverser flaps 104 are side-by-side, they are spaced apart from one another in order to maintain a space 400 which allows operation without the flaps interacting with one another.

This space 400 thus opens up a path for part of the bypass air flow 208, which can pass through this space 400 and flow to the exhaust nozzle of the jet engine 100. The space 400 thus forms a leakage window 400 through which part of the bypass air flow 208 flows in the deployed position.

As shown in FIG. 4, at least one reverser flap 104 comprises a leakage window 400, 410 that is provided in order to permit air flow in the deployed position, and the leakage window 400, 410 may be a leakage window 400 which comprises the space that extends around the reverser flap 104, or a leakage window 410 which comprises a hole passing through the reverser flap 104. It is of course possible to have one or other or both of these leakage windows 400, 410.

In order to limit the power of that part of the bypass flow 208 which passes through the leakage window 400, 410, means for generating vortices to the rear of the reverser flap 104 are arranged across the leakage window 400.

Figure 5:
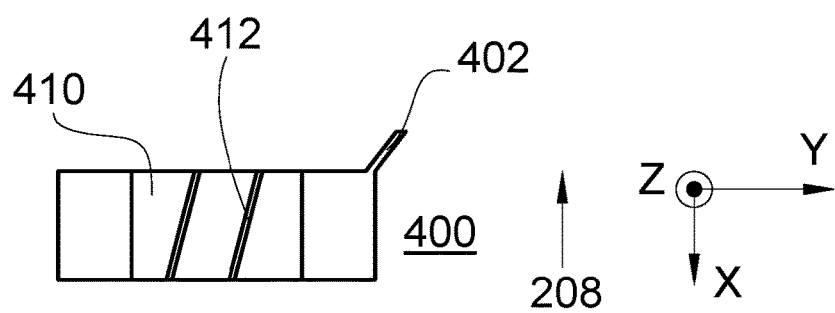
FIG. 5 is a view in section, along line V-V of FIG. 4, of a reverser flap according to a particular embodiment of the invention.

FIG. 5 shows a view in section of the reverser flap 104.

The vortex-generating means are in the form of fins 402, 412 which extend across the leakage window 400, 410. The generation of vortices by the fins 402, 412 disturbs the flow of air, which loses power.

Figure 8:
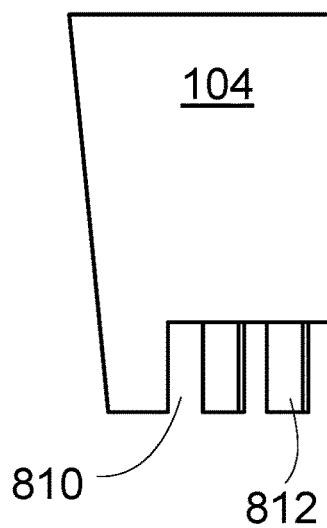
FIG. 8 is a view similar to that of FIG. 4 for another embodiment of the invention.

FIG. 8 shows a variant in terms of the position of the leakage window. In this embodiment of the invention, the leakage window 810 is in the form of a notch passing through the reverser flap 104 at the downstream edge of the reverser flap 104. Fins 812 are also positioned across the leakage window 810.

Figure 9:
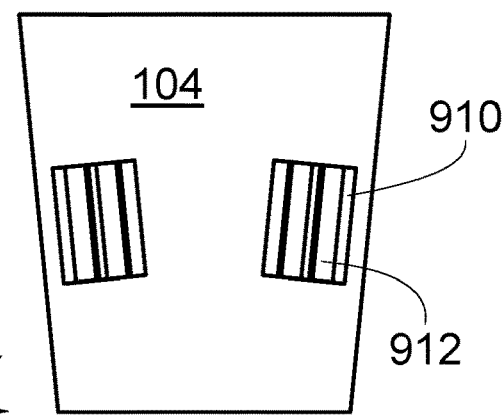
FIG. 9 is a view similar to that of FIG. 4 for another embodiment of the invention.

FIG. 9 shows a variant in which the number of leakage windows and the positions of the leakage windows differ. In this embodiment of the invention, there are two leakage windows 910, and each leakage window 910 is in the form of a hole passing through the reverser flap 104. Fins 912 are also positioned across the leakage window 910.

Figure 6:
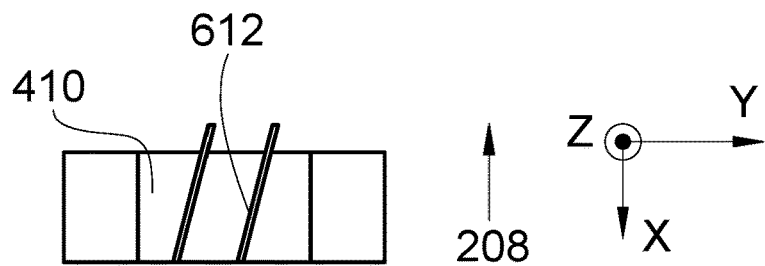
FIG. 6 is a view similar to that of FIG. 5 for another embodiment of the invention.
Figure 7:
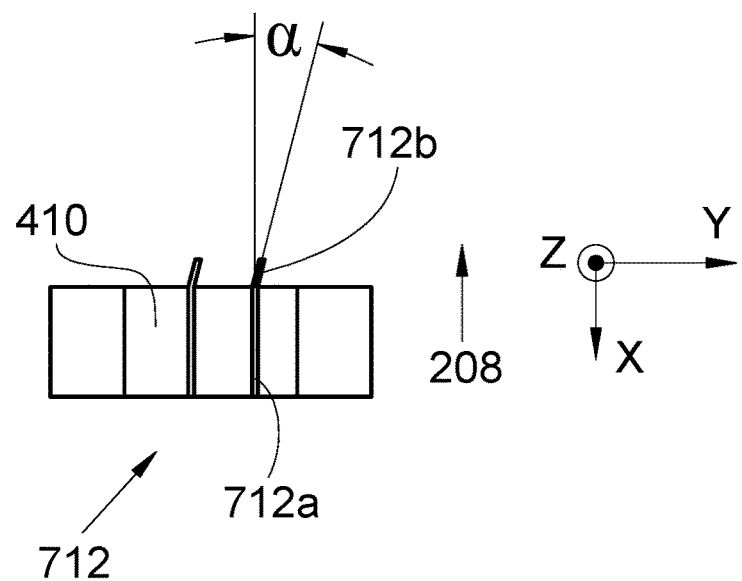
FIG. 7 is a view similar to that of FIG. 5 for another embodiment of the invention.

FIGS. 5 to 7 show different types of fins which may be employed across a leakage window that takes the form of a hole passing through the reverser flap 104. These different types of fins may also be employed in the context of the leakage windows of FIGS. 8 and 9.

In the embodiment of FIG. 5, each fin 412 is in the form of a plane inclined with respect to the plane of the reverser flap 104, where the fin 412 is bounded by the perforated faces of the reverser flap 104. The plane of the reverser flap 104 is the median plane between the planes of the perforated faces of the reverser flap 104.

In the embodiment of FIG. 6, each fin 612 is in the form of a plane inclined with respect to the plane of the reverser flap 104 which, on one hand, is bounded by the forward-facing perforated face of the reverser flap 104 and which, on the other hand, extends beyond the rearward-facing perforated face of the reverser flap 104.

In the embodiment of FIG. 7, each fin 712 is in the form of a first plane 712*a* and a second plane 712*b* continuing from the first plane 712*a*. The first plane 712*a* is perpendicular to the plane of the reverser flap 104 and is bounded by the perforated faces of the reverser flap 104, and the second plane 712*b* is inclined with respect to the plane of the reverser flap 104 and extends from and beyond the rearward-facing perforated face of the reverser flap 104.

Of course, depending on requirements, it is possible to combine the various embodiments described above, for example by combining different types of leakage window, arranging multiple leakage windows in each reverser flap 104, using different types of fin.

The invention has been more particularly described in the case of a nacelle under a wing but can be applied to a nacelle located at the rear of the fuselage.

In the embodiment of the invention presented here, the reverser flaps 104 are mounted so as to be able to move only in rotation, but it is possible to provide for the reverser flaps to be mounted on a slider that is able to move in translation and is secured to the rear cowl 207. Passage to the deployed position is then preceded by retraction of the mobile slider and of the rear cowl 207.

The surface area of the leakage window 400, 410, 810, 910 preferably makes up between 5% and 30% of the surface area of the reverser flap 104.

In the embodiment of FIG. 7, the angle α between the first plane 712*a* and the second plane 712*b* is preferably between 5° and 45°.

In the embodiment of FIG. 6 and the embodiment of FIG. 7, the length of the plane 612, 712*b* which lies beyond the rearward-facing perforated face of the reverser flap 104 is preferably between 5 mm and 30 mm.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan comprising:
a motor and a nacelle, surrounding the motor,
wherein a duct for a bypass flow is delimited between the nacelle and the motor and in which a flow of air flows,
the nacelle comprising reverser flaps where each reverser flap is articulated between a stowed position in which the reverser flap is not positioned in the bypass duct and a deployed position in which the reverser flap extends across the bypass duct,
at least one reverser flap of the reverser flaps has at least one leakage window configured to allow airflow in the deployed position, and
wherein said at least one reverser flap has at least one fin extending across said at least one leakage window,
wherein the at least one leakage window comprises a hole passing through said at least one reverser flap, and
wherein the at least one fin has a form of a first plane and a second plane continuing from the first plane,
wherein the first plane is perpendicular to a plane of the at least one reverser flap and is bounded by forward-facing and rearward-facing perforated faces of the at least one reverser flap, and
wherein the second plane is inclined with respect to the plane of the at least one reverser flap and extends from and beyond the rearward-facing perforated face of the at least one reverser flap.

2. The turbofan according to claim 1, wherein the at least one leakage window is formed as a notch which passes through said at least one reverser flap at a downstream edge of the at least one reverser flap.

3. The turbofan according to claim 1, wherein the at least one leakage window is formed by a hole which passes through said at least one reverser flap at a central position of the at least one reverser flap.

4. An aircraft comprising at least one turbofan according to claim 1.

* * * * *